Oct. 10, 1933.   H. K. BINKS   1,930,380
SUPPORTING SURFACES FOR AIRCRAFT
Filed Sept. 15, 1932
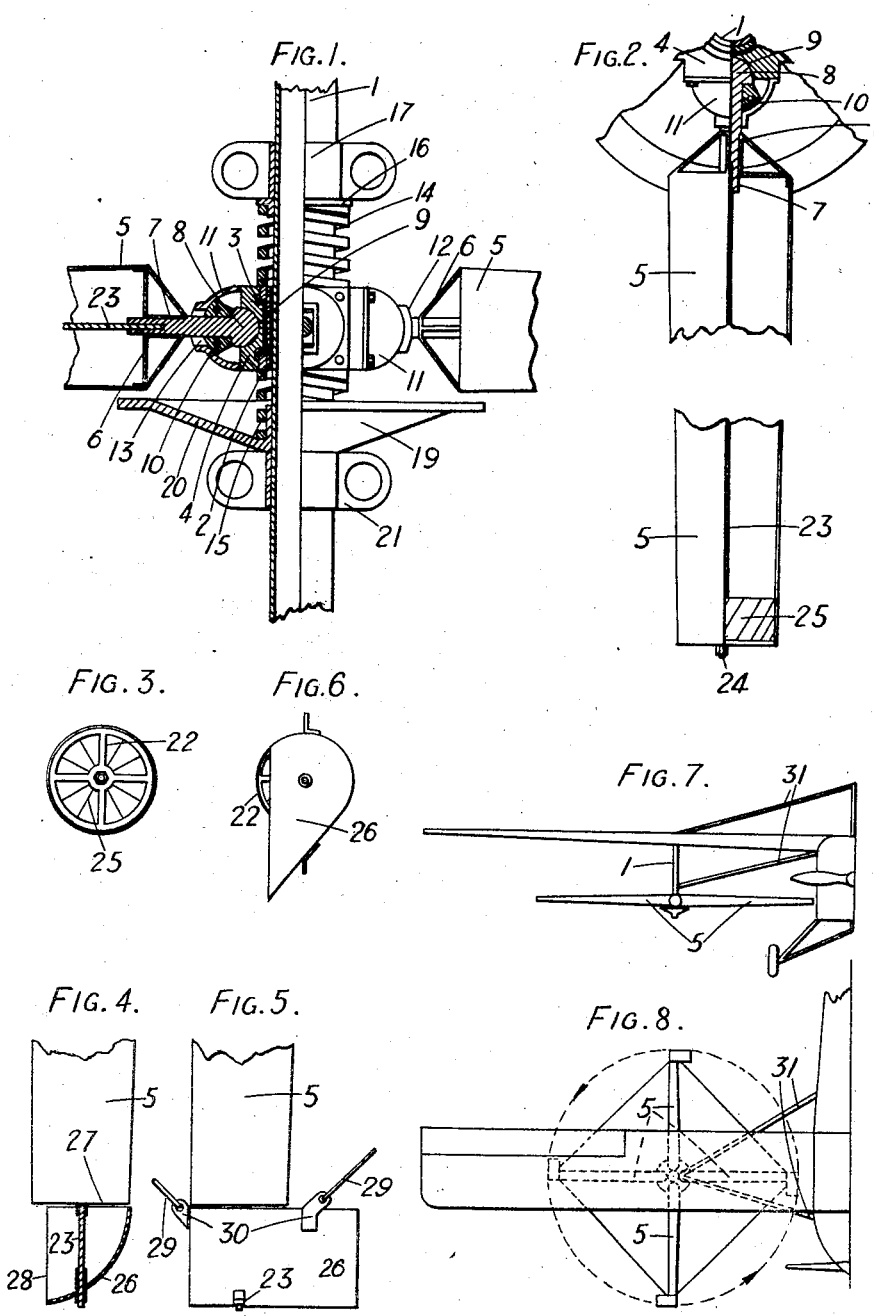
INVENTOR
Herbert K. Binks
BY
Chas. J. Williamson
ATTORNEY Patented Oct. 10, 1933

1,930,380

UNITED STATES PATENT OFFICE 1,930,380

SUPPORTING SURFACE FOR AIRCRAFT

Herbert Kay Binks, Nairobi, Kenya Colony, Africa

Application September 15, 1932, Serial No. 633,365, and in Great Britain September 3, 1931

9 Claims. (Cl. 244—19)

This invention relates to movable supporting surfaces for aircraft, the object of the invention being to provide improved surfaces of this character which shall be able to operate either alone or in conjunction with the usual fixed supporting surfaces.

According to the present invention, I provide supporting surfaces for aircraft, comprising two or more members which are so constructed and arranged that they are adapted to be revolved by the force of the air current in which they are disposed about a common axis perpendicular, or substantially perpendicular, to the plane of the longitudinal axes of the members, and which are also caused to rotate about their longitudinal axes by the action of air currents whilst simultaneously revolving.

Preferably, two or more tubular members are provided and arranged to be revolved about a common axis by the force of the air current in which they are disposed, each of said members also being arranged to be rotated about its longitudinal axis by the action of an air current passing axially through the member. The said members may be provided with means whereby the air passing axially through them is deflected downwards as it leaves the tubular members, said means augmenting the lifting action of the members and also preventing a reversal of flow of the air currents through the members.

Other features of the invention are referred to in the following description of a constructional form of the invention.

In order that the invention may be clearly understood reference is now made to the accompanying sheet of drawing whereon one constructional form of the invention and an application thereof to a monoplane are shown, by way of example, and whereon:—

Fig. 1 is a fragmentary elevation, partly in section, of two rotors and their co-operating mechanism:

Fig. 2 is a plan view, partly in section, of one of the rotors:

Fig. 3 is a view of the outer end of a rotor;

Fig. 4 is a fragmentary view of a rotor and its co-operating deflector, the latter being shown in sectional elevation;

Fig. 5 is a plan view corresponding to Fig. 4;

Fig. 6 is an end view corresponding to Fig. 5;

Fig. 7 is a view illustrating the application of the invention to a monoplane; and Fig. 8 is a plan view corresponding to Fig. 7.

Referring to the drawing:—

The arrangement comprises a tubular member 1 whereon a sleeve 2 is slidably arranged, said sleeve forming the inner housing of a ball race 3 provided with an outer race 4. This particular construction comprises four cylindrical rotors 5, each of which is provided, at its inner end, with a spider 6 secured to a stub shaft 7. The latter is formed at its inner end with a substantially hemispherical member 8, which is turnably arranged in a hemispherical socket or bearing 9 formed in the outer housing 4. Each of the stub shafts is rotatably supported in, and held in position by, a ball thrust race 10, the outer surface of which is turnably arranged in the interior of the cover 11 fixed to the housing 4. Each of the covers 11 is provided with a projecting boss 12 in which an opening 13 is formed, said opening permitting the pivotal movement of the shaft 7 about its hemispherical socket. The rotors are floatingly supported upon the tubular member 1 between springs 14 and 15. The upper end of the spring 14 bears against a collar 16 which is adjustably fixed in position upon the member 1 by means of a split-socket 17, and the lower end of the spring 15 bears on the interior of a dished member 19 formed with a peripheral track 20. The said member 19 is adjustably fixed in position on the tube 1 by means of a split-socket 21.

Each of the rotors 5 is retained in its longitudinal position by being secured between the said spider 6 and a spider 22 mounted upon a rod 23 extending axially through the rotor, a nut 24 securing the spider 22 in position. A plurality of radial blades or vanes 25 are provided internally and at the outer end of the rotor 5. As shown in Figs. 4 to 6, a deflector 26 is loosely mounted on the outwardly projecting end of the rod 23, said deflector being cowl-shaped and provided with an opening 27 registering with the adjacent end of the rotor 5. Each deflector is also formed with an opening 28 at its lower part. The deflectors are prevented from turning about the rods 23; for example, by means of wires 29 anchored at their outer ends to the lugs 30 and, if so desired, the deflectors may be interconnected by means of the said wires, as shown in Figs. 7 and 8.

The complete rotor arrangement, comprising two or more rotors 5, is arranged in the slip stream of the propeller. When the propeller is revolving the slip stream therefrom causes each of the rotors to revolve. When the rotors are inoperative and at the commencement of their revolving movement, by virtue of the hemispherical members 8 and the corresponding bearings 9, the rotors roll around the peripheral tract 20 on the member 19. When, however, the speed of revolution of the rotors has increased sufficiently, centrifugal force causes the rotors to move upwards out of contact with the track, the member 8 pivoting in the socket 9. After a certain time, therefore, the rotors are floatingly supported between the springs 14 and 15. It will be understood that the friction between the rotors 5 and the track 20 will cause the rotors to rotate about their axes as they revolve. As each of the rotors revolves, air is drawn into the interior of the rotor from the inner end thereof through the spider 6. The air current travels outwards through the rotor and impinges against the blades 25, thus causing the rotation of the rotor about its axis to be continued after the rotors have left the track 20.

After impinging on the blades 25, the air passes into the deflector 26 and leaves the latter in a downward direction thus exerting a downward pressure on the surrounding air.

It should be noted that the arrangement provides three distinct lifting values. In the first place, the air entering the rotors is drawn from above by virtue of the member 19, which closes the approach to the inner ends of the rotors from the underside. Secondly, the lifting effect caused by the action of the rotating rotors and, thirdly, the downward pressure of the air streams escaping from the open lower ends of the deflectors 26. The deflectors also have the effect of preventing the reversal of the air flow through the rotors at such periods when the outer ends of the rotors are presented to the line of flight and to the slip stream.

In the case of known rotating blades of aircraft, the forward motion of the latter is necessary in order to obtain the automatic revolution of the blades. This is only partly the case in the present invention, since a positive force viz., that of the slip stream, or mechanical means, exerts a positive turning effort on the rotors. Thus, whereas in the known arrangements the blades slow down after a certain speed of forward travel, in the present invention the speed of the slip stream is always in excess of the rotary movement of the rotors. As a considerable portion of the load is carried by the rotors, very little forward run causes the aircraft to leave the ground. After the required height has been attained the engine can be closed down to about a quarter normal speed, since the positive force applied to the rotors by the slip stream has a stabilizing effect, whilst the frictional resistance of the rotors is much below that of fixed wings.

The rotors may be employed as stabilizers, as well as supporting surfaces, in conjunction with the ordinary wings of an aircraft. Such an application is shown in Figs. 7 and 8, in which a monoplane is illustrated. Two rotor arrangements are used and in each the tubular member 1 is suspended from the wing and braced by the members 31 connected to the fuselage. Each arrangement comprises four rotors 5 arranged at 90° to each other, and the four deflectors 26 are interconnected by the wires 30.

An important feature of this arrangement is its ability to resist a sudden drop on the part of the aircraft owing to the gyroscopic effect of the rotors.

It will be appreciated that the present invention can be equally well applied to multi-planed aircraft and to single or multi-engined aircraft.

I claim:

1. Supporting surfaces for aircraft, comprising two or more tubular members, means mounting them for revolution about a common axis by the force of the air current in which they are disposed, means supporting each of said members for rotation about its longitudinal axis by the action of an air current passing axially through the member, each member having an air inlet at one end and an air outlet at the opposite end.

2. Supporting surfaces for aircraft having tubular members arranged to be revolved about a common axis by the force of the air current in which they are disposed and open at both ends whereby the air may pass axially through them, and having means that deflect the air downwards as it leaves the tubular members, thereby is augmented the lifting action of the members.

3. Supporting surfaces for aircraft as claimed in claim 1, in which the tubular members are pivotally supported for pivotal movement as well as of revolutionary and rotating movements.

4. Supporting surfaces for aircraft as claimed in claim 1 comprising means that rotate the tubular members about their longitudinal axes concurrently with the revolution thereof about the common axis, said means also acting to cause the air which passes axially through the members to be drawn from above the latter.

5. Supporting surfaces for aircraft comprising tubular members mounted for revolution about a common axis by the force of the air current in which they are disposed, said members being open to the air at opposite ends for the entrance of air into and its passage through and out of the same, and means for causing the air passing axially through the tubular members to be deflected downwards consists of a deflector arranged in fixed relationship to, and at the outer end of, the tubular member and open at its lower part.

6. An aircraft having supporting surfaces comprising rotors rotatable upon their longitudinal axes, means supporting said rotors to revolve about a common axis, and means for imparting rotation to such rotors comprising a track below the inner ends of the rotors and with which they have temporary contact in their revolution about their common axis said rotors moving away from the track as their rate of rotation increases.

7. An aircraft having supporting surfaces comprising rotors rotating upon their longitudinal axes, means supporting said rotors to revolve about a common axis, and means for imparting rotation to such rotors comprising a track below the inner ends of the rotors and with which they have contact in their revolution about their common axis, said rotors being pivoted at their inner ends above said track to swing away from the track under the effect of centrifugal force.

8. An aircraft having supporting surfaces comprising tubular members, means for supporting said members to revolve about a common axis, said members being rotatable upon their longitudinal axes, said tubular members having each an air inlet and an air outlet at opposite ends for the entrance of air into, through and out of the tubular members and tubular member driving means situated within the tubular member for driving contact with air passing through the tubular member.

9. An aircraft having supporting surfaces comprising rotors rotatable upon their longitudinal axes and means supporting them for revolution about a common axis comprising a central shaft and a turnable connection between the members and the shaft, floatingly mounted for endwise movement along the shaft.

HERBERT KAY BINKS.